United States Patent

Adams et al.

[11] Patent Number: 5,999,584
[45] Date of Patent: Dec. 7, 1999

[54] REACTOR HEAD LIFT APPARATUS

[75] Inventors: Larry A. Adams, Goode; James E. McCann, Lynchburg, both of Va.

[73] Assignee: Framatome Technologies, Inc., Lynchburg, Va.

[21] Appl. No.: 09/027,944

[22] Filed: Feb. 23, 1998

[51] Int. Cl.⁶ .................................................. G21C 19/00
[52] U.S. Cl. ..................... 376/262; 376/260; 376/263; 376/268
[58] Field of Search ................... 114/51, 113, 223; 254/47, 91; 414/146, 561, 788; 294/67.1, 81.1, 81.21, 81.52, 67.32, 906; 376/260, 262, 263, 268

[56] References Cited

U.S. PATENT DOCUMENTS

| | | | |
|---|---|---|---|
| 578,397 | 3/1897 | Foster | 294/87.1 |
| 3,282,044 | 11/1966 | Maisey | 376/268 |
| 3,343,863 | 9/1967 | Medal | 376/262 |
| 3,427,006 | 2/1969 | Oiestad | 261/112 |
| 3,428,356 | 2/1969 | Anderson | 376/260 |
| 3,625,558 | 12/1971 | Johnson | 294/83 R |
| 3,658,373 | 4/1972 | Elkow et al. | 294/67 |
| 3,972,553 | 8/1976 | Johnston | 294/67 DA |
| 4,138,321 | 2/1979 | Scholz et al. | 176/87 |
| 4,272,321 | 6/1981 | Betancourt et al. | 176/87 |
| 4,289,291 | 9/1981 | Goddard | 248/293 |
| 4,678,623 | 7/1987 | Malandra et al. | 376/260 |
| 4,828,311 | 5/1989 | Hayashi | 294/67.3 |
| 4,830,814 | 5/1989 | Altman | 376/287 |
| 4,930,827 | 6/1990 | Tihansky | 294/81.56 |
| 5,043,132 | 8/1991 | Schramm et al. | 376/260 |
| 5,116,094 | 5/1992 | Jones | 294/81.61 |
| 5,161,845 | 11/1992 | Carpenter, Jr. | 294/90 |
| 5,476,300 | 12/1995 | Dodge | 294/81.21 |
| 5,706,319 | 1/1998 | Holtz | 376/203 |
| 5,734,690 | 3/1998 | Sakamaki | 376/260 |

*Primary Examiner*—Charles T. Jordan
*Assistant Examiner*—Jack Keith
*Attorney, Agent, or Firm*—Rhodes & Mason, PLLC

[57] ABSTRACT

A rigging system for reactor closure head and reactor internals lifts. The system includes a plurality of latchbox pendants attached to the lifting structure of an overhead crane. A first set of a plurality of lifting lugs is attached to the reactor internals, each of the lifting lugs corresponding to one of the plurality of latchboxes. A second set of a plurality of substantially identical lifting lugs, each of the lifting lugs corresponding to one of the plurality of latchboxes, is attached to a plurality of solid rod lifting pendants attached at one end to the reactor closure head. In operation, the latchbox pendants may be rigged once to the overhead crane for handling reactor internals and left in place throughout the entire rigging sequence without changing to turnbuckle pendants for reactor closure head handling.

12 Claims, 5 Drawing Sheets

REACTOR HEAD LIFT APPARATUS

BACKGROUND OF THE INVENTION

(1) Field of the Invention

The present invention relates generally to rigging components used for lifting heavy objects and, more particularly, to a system for rigging components for the heads of nuclear reactor vessels.

(2) Description of the Prior Art

Nuclear reactor vessel heads must be lifted and removed periodically to perform scheduled or corrective maintenance. Also, the reactor internals may need to be lifted at the same time for similar reasons. Currently, lifting either of these components requires up to four rigging changes during a typical reactor outage. These changes are required because some reactor components must be lifted using a combination of turnbuckle pendants, solid rod lifting pendants, and/or bridge strands, while others must be lifted using latchbox pendants, solid rod lifting pendants, and/or bridge strands. The changeover between these rigging components requires a large amount of time and manpower.

It should be understood that the components being lifted are quite heavy, in some cases over 20 tons. Thus the rigging components are massive in size and require a great deal of time to change out. The time factor is important because increasing the time required to remove components increases personnel radiation exposure and the total time that a reactor must be out of service for maintenance/repair. Because the above-mentioned components are difficult to maneuver, each requirement for a rigging change increases the chance of personnel injury. Considerable cost-savings can be achieved and the chances for personnel injury may be reduced by reducing the number of rigging changes required for each lift. However, because of the capital expenditures restraints all utilities must live with, the cost of the rigging conversion must be relatively low.

Thus, there remains a need for a new and improved rigging system for nuclear reactor components that reduces the number of rigging changes required during a reactor outage while, at the same time, is easy to add to the existing rigging system.

SUMMARY OF THE INVENTION

The present invention is directed to a rigging system for reactor closure head and reactor internals lifts. The system includes a plurality of latchbox pendants attached to the lifting structure of an overhead crane. A first set of a plurality of lifting lugs is attached to the reactor internals, each of the lifting lugs corresponding to one of the plurality of latchboxes. A second set of a plurality of substantially identical lifting lugs, each of the lifting lugs corresponding to one of the plurality of latchboxes, is attached to a plurality of solid rod lifting pendants attached at one end to the reactor closure head. In the preferred embodiment, adjustable turnbuckles are attached between each of the substantially identical lifting lugs and the plurality of solid rod lifting pendants attached to the reactor closure head.

In operation, the latchbox pendants may be rigged once to the overhead crane for handling reactor internals and left in place throughout the entire rigging sequence without changing to turnbuckle pendants for reactor closure head handling.

Accordingly, one aspect of the present invention is to provide a rigging system for reactor closure head and reactor internals lifts. The system includes: (a) a plurality of latchbox pendants attached to the lifting structure of an overhead crane; (b) a first set of a plurality of lifting lugs attached to the reactor internals, each of the lifting lugs corresponding to one of the plurality of latchboxes; and (c) a second set of a plurality of substantially identical lifting lugs attached to the reactor closure head, each of the lifting lugs corresponding to one of the plurality of latchboxes; whereby the latchbox pendants may be rigged once to the overhead crane for handling reactor internals and left in place throughout the entire rigging sequence without changing to turnbuckle pendants for reactor closure head handling.

Another aspect of the present invention is to provide a conversion kit for an existing rigging system for reactor closure head and reactor internals lifts, the existing rigging system including a plurality of latchbox pendants attached to the lifting structure of an overhead crane and a first set of a plurality of lifting lugs attached to the reactor internals, each of the lifting lugs corresponding to one of the plurality of latchboxes. The conversion kit includes: (a) a second set of a plurality of substantially identical lifting lugs attached to the reactor closure head, each of the lifting lugs corresponding to one of the plurality of latchboxes; and (b) a plurality of adjusting means attached between each of the substantially identical lifting lugs and the reactor closure head, whereby the latchbox pendants may be rigged once to the overhead crane for handling reactor internals and left in place throughout the entire rigging sequence without changing to turnbuckle pendants for reactor closure head handling.

Still another aspect of the present invention is to provide a rigging system for reactor closure head and reactor internals lifts. The system includes: (a) a plurality of latchbox pendants attached to the lifting structure of an overhead crane; (b) a first set of a plurality of lifting lugs attached to the reactor internals, each of the lifting lugs corresponding to one of the plurality of latchboxes; and (c) a second set of a plurality of substantially identical lifting lugs attached to the reactor closure head, each of the lifting lugs corresponding to one of the plurality of latchboxes; (d) a plurality of solid rod lifting pendants attached at one end to the reactor closure head; and (e) a plurality of adjusting means attached between each of the substantially identical lifting lugs and the plurality of solid rod lifting pendants attached to the reactor closure head, whereby the latchbox pendants may be rigged once to the overhead crane for handling reactor internals and left in place throughout the entire rigging sequence without changing to turnbuckle pendants for reactor closure head handling.

These and other aspects of the present invention will become apparent to those skilled in the art after a reading of the following description of the preferred embodiment when considered with the drawings.

DESCRIPTION OF THE PREFERRED EMBODIMENTS

Figure 1:
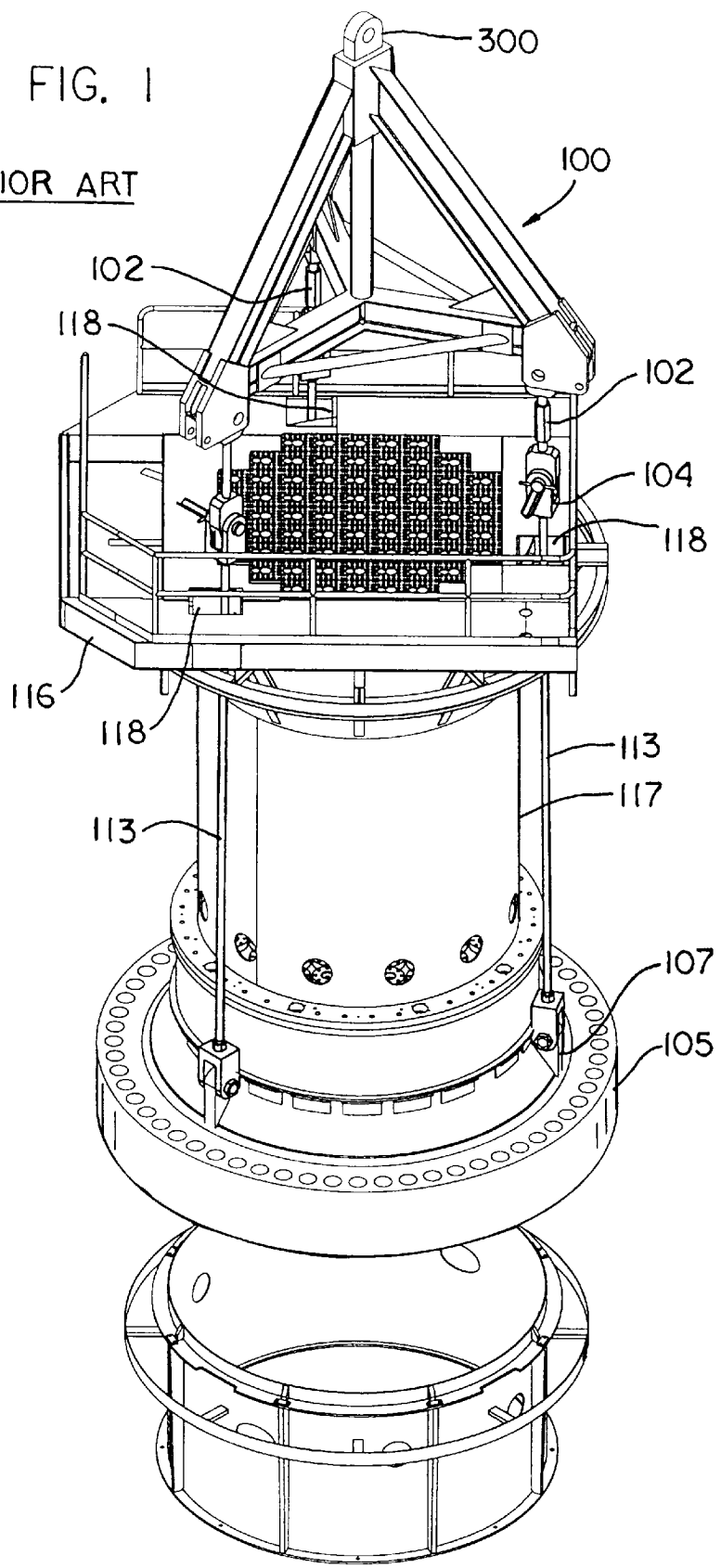
FIG. 1 is perspective view of a prior art lifting system using turnbuckle pendants and solid rod lifting pendants.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, there is illustrated a prior art system for lifting a reactor pressure vessel head. The lifting operation is conducted using a cable (not shown) connected to lifting eye 300 of tripod handling fixture 100 ("tripod"). Each leg of tripod 100 carries a rigging component used to lift reactor pressure vessel head 105.

Figure 2:
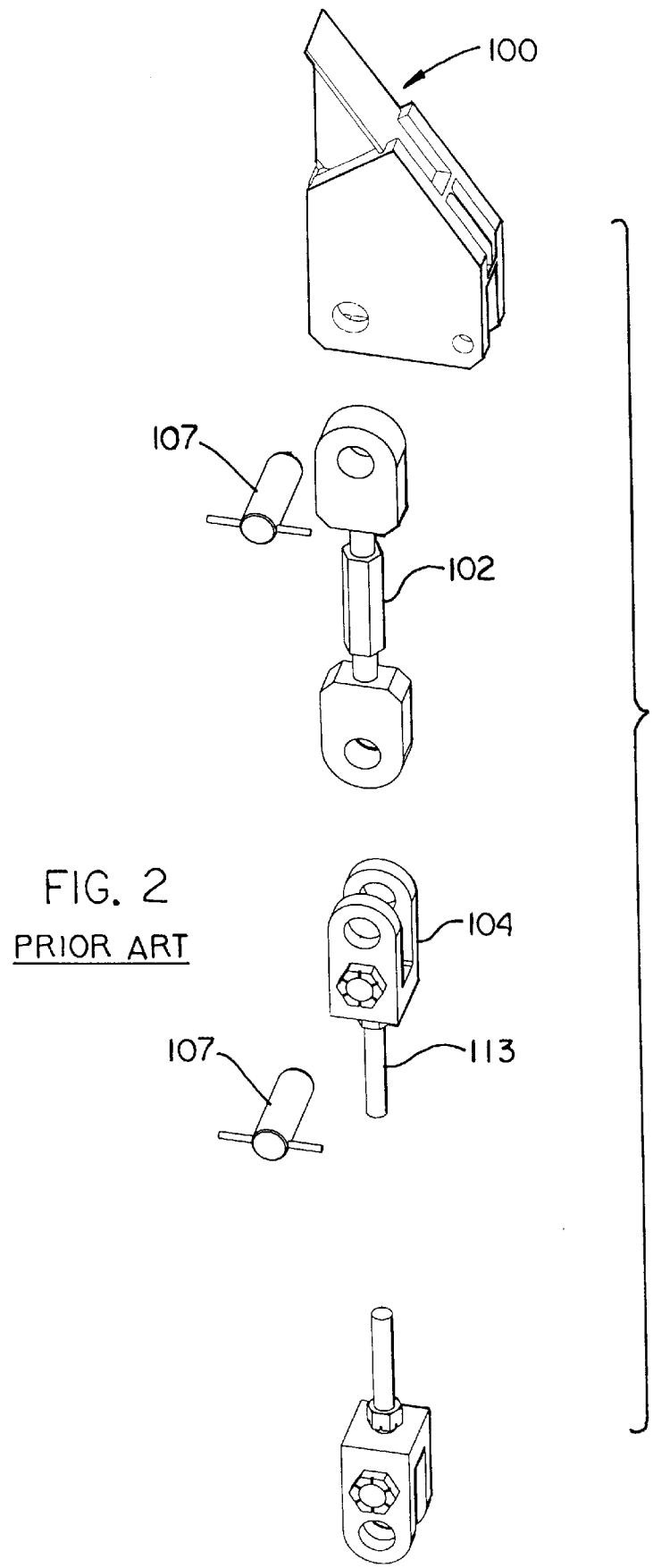
FIG. 2 is an exploded view of one leg of the prior art lifting system illustrated in FIG. 1.

In the prior art system, turnbuckle pendants 102 extend downwardly from each tripod mounting point. A clevis 104 is provided at the lower end of each turnbuckle pendant 102 for attaching additional components. Typically, a solid rod lifting pendant 113 as shown in the exploded view of FIG. 2 is connected between the lower end of turnbuckle pendant 102 and pressure vessel head lifting eye 107. Alternatively, a bridge strand pendant (not shown) may be used in place of the turnbuckle pendant. In this example, three of each of the items discussed above are provided at equidistant points around the circumference of reactor closure head 105. Secured to the top of head 105 is a service structure 117. Atop the service structure is positioned a work platform 116 which serves as a staging area for personnel and equipment. Solid rod lifting pendants 113 extend through openings 118 and work platform 116 to make up the necessary connections. Alternatively, bridge strands (not shown) may be substituted for the solid rod lifting pendants 113.

The prior art rigging system described above requires four rigging changes during an outage because the components that are suitable for mating up to the pressure vessel head 105 are not suitable for mating up to the reactor internals. Although the type of connections that must be made up are relatively simple, the large weight of the components makes their handling difficult, time consuming, and necessitates prolonged exposure to high radiation components.

For example, the turnbuckle pendants 102 and the bridge strands each weigh several hundred pounds each. The connecting pins 107 for these components may weigh one hundred pounds or more and must be positioned and driven into place by hand. The workers carrying out these tasks must often work at awkward angles thus increasing the possibility of personal injury as the number of required rigging changes increases.

Figure 3:
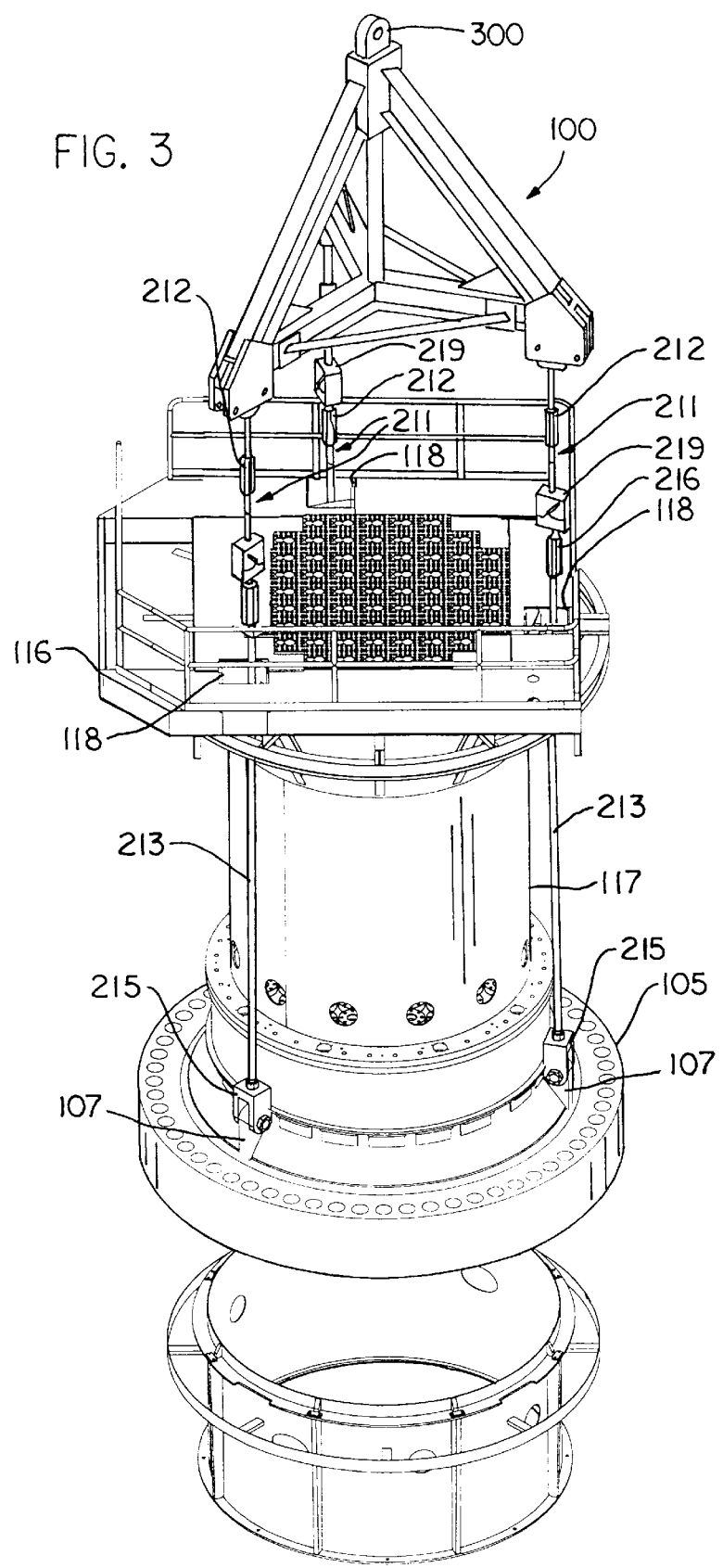
FIG. 3 is a perspective view of a lifting system constructed according to the present invention.
Figure 4:
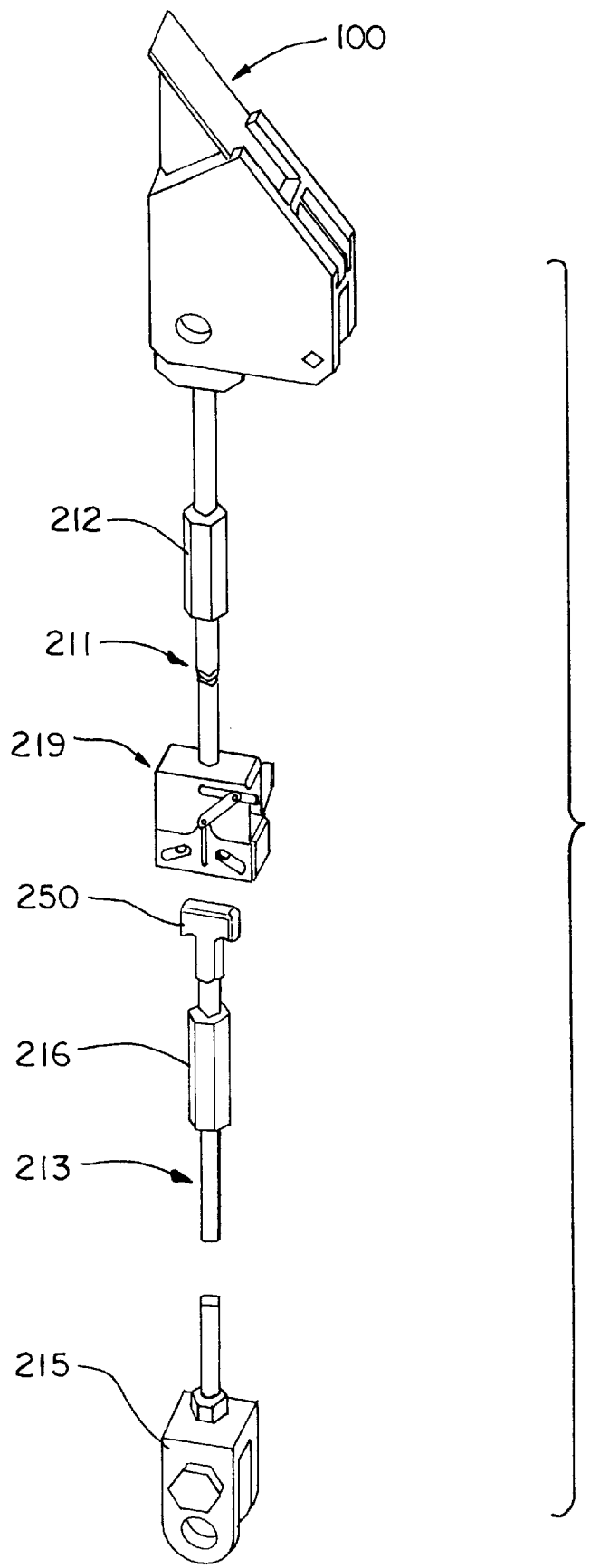
FIG. 4 is an exploded view of one leg of the lifting system of the present invention.

A rigging system constructed according to the present invention is illustrated in FIGS. 3 and 4. Tripod 100 carries three latchbox pendants 211 each of which include a leveling turnbuckle 212 and a latchbox 219. The construction and operation of latchbox 219 is well known in the art and will not be described in detail here.

According to the present invention, each of the latchbox pendants 211 is secured to a novel solid rod lifting pendant 213. As shown in FIG. 4, each solid rod lifting pendant 213 includes a T-shaped lifting lug 250 at a first end, a clevis 215 at the opposite end and an adjustable turnbuckle 216 adjacent to the T-shaped lifting lug 250 which allows the reactor head 105 or other item being lifted to be leveled without changing the reactor internals lift settings on the latchbox pendants 211 after they have been initially set.

In operation, as the tripod 100 and the downwardly extending latchbox pendants 211 are lowered through access openings 118 in the work platform 116, each lifting lug 250 engages a corresponding latchbox 219 without the need for manhandling a connector or cable. Although a T-shaped lug 250 is illustrated in FIG. 4, other lugs types will work as well, depending on the internal design of the particular latchbox 219.

Figure 5:
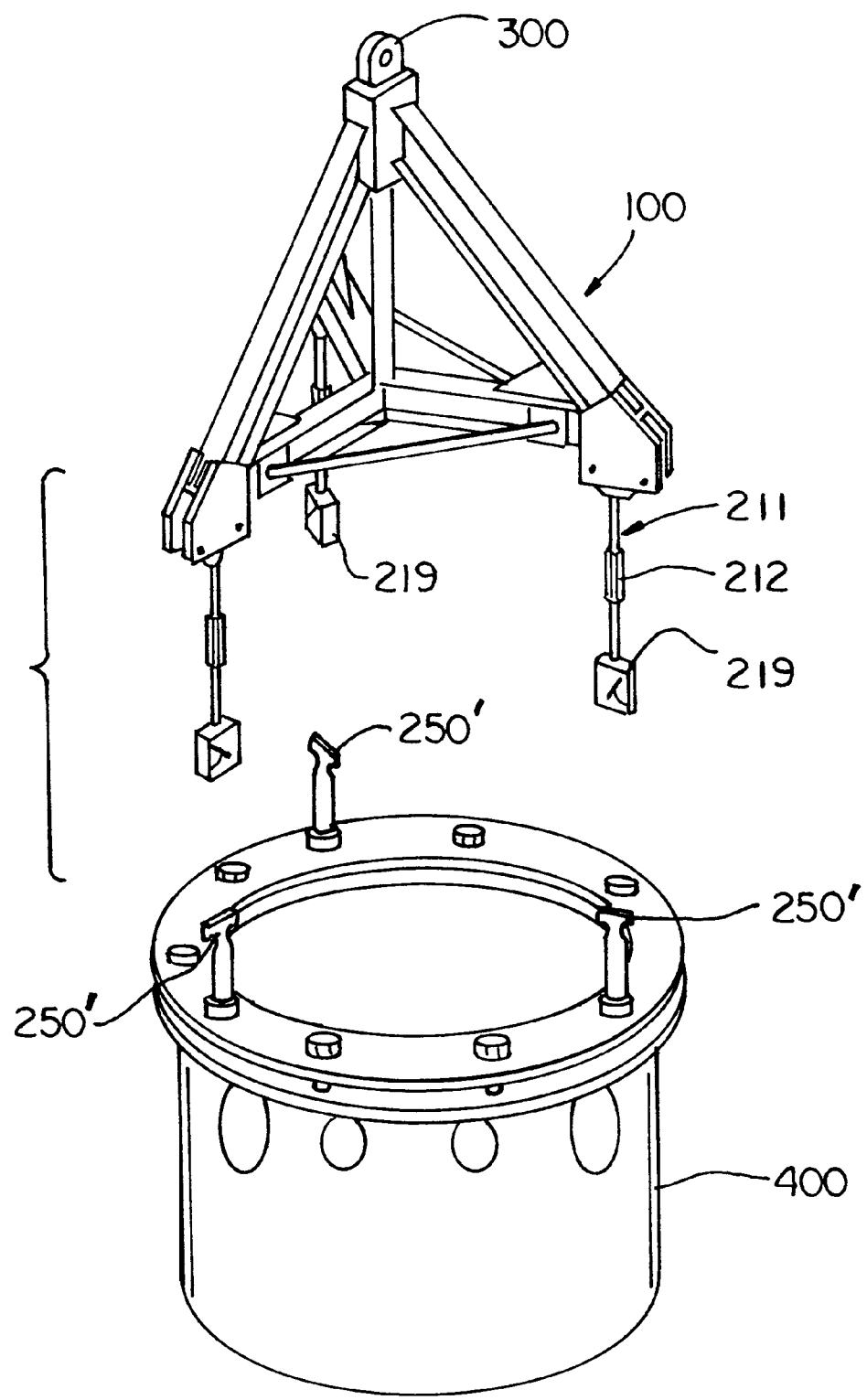
FIG. 5 is a perspective view of the lifting system shown in FIG. 3 positioned to lift the reactor internals.

The advantages of the present invention stems from the fact that the latchbox pendants 211 may be rigged once to tripod 100 and left in place throughout the entire rigging sequence. There is no need to rig latchbox pendants 211 to tripod 100 for reactor internals handling (see FIG. 5) and then change to turnbuckle pendants 102 for reactor closure head handling.

For reactors that have solid lifting rods already installed in place of cables, the practice of the present invention requires only that adjustable turnbuckles 216 and lifting lugs 250 be installed thereon. Note that the present invention does not affect the interface between the shielded work platform (not shown) and the service structure work platform 116 and, therefore, does not require expensive modifications to the structure.

Certain modifications and improvements will occur to those skilled in the art upon a reading of the foregoing description. By way of example, while the preferred embodiment of the invention teaches adding the lifting lug and turnbuckle to a solid lifting rod, the present invention can still be used on cable-type systems by manually inserting the lifting lug into the latch box pendant. It should be understood that all such modifications and improvements have been deleted herein for the sake of conciseness and readability but are properly within the scope of the following claims.

We claim:

1. A rigging system for reactor closure head and reactor internals lifts, the system comprising:
    (a) a plurality of latchbox pendants attached to the lifting structure of an overhead crane;
    (b) a first set of a plurality of T-shaped lifting lugs attached to said reactor internals, each of said lifting lugs corresponding to one of said plurality of latchboxes; and
    (c) a second set of a plurality of substantially identical T-shaped lifting lugs attached to said reactor closure head, each of said lifting lugs corresponding to one of said plurality of latchboxes; whereby said latchbox pendants may be rigged once to said overhead crane for handling reactor internals and left in place throughout the entire rigging sequence without changing to turnbuckle pendants for reactor closure head handling.

2. The apparatus according to claim 1, further a plurality of solid rod lifting pendants attached at one end to said reactor closure head and at the other end to said second set of lifting lugs.

3. The apparatus according to claim 1, wherein said plurality of latchbox pendants attached to the lifting structure of an overhead crane includes an adjustable turnbuckle between said latchboxes and said lifting structure.

4. The apparatus according to claim 1, wherein said lifting structure of an overhead crane is a tripod to provide a 3-point lift to maintain said reactor internals and said reactor closure head level.

5. A conversion kit for an existing rigging system for reactor closure head and reactor internals lifts, said existing rigging system including a plurality of latchbox pendants attached to the lifting structure of an overhead crane and a first set of a plurality of T-shaped lifting lugs attached to said reactor internals, each of said lifting lugs corresponding to one of said plurality of latchboxes, said conversion kit comprising:

(a) a second set of a plurality of substantially identical T-shaped lifting lugs attached to said reactor closure head, each of said lifting lugs corresponding to one of said plurality of latchboxes; and (b) a plurality of adjusting means attached between each of said substantially identical lifting lugs and said reactor closure head, whereby said latchbox pendants may be rigged once to said overhead crane for handling reactor internals and left in place throughout the entire rigging sequence without changing to turnbuckle pendants for reactor closure head handling.

6. The apparatus according to claim 5, wherein said adjusting means is at least one turnbuckle.

7. The apparatus according to claim 5, wherein said adjusting means is a plurality of turnbuckles and one end of each said second set of a plurality of lifting lugs is threaded into each of said turnbuckles.

8. A rigging system for reactor closure head and reactor internals lifts, said system comprising:

(a) a plurality of latchbox pendants attached to the lifting structure of an overhead crane;

(b) a first set of a plurality of T-shaped lifting lugs attached to said reactor internals, each of said lifting lugs corresponding to one of said plurality of latchboxes; and (c) a second set of a plurality of substantially identical T-shaped lifting lugs attached to said reactor closure head, each of said lifting lugs corresponding to one of said plurality of latchboxes;

(d) a plurality of solid rod lifting pendants attached at one end to said reactor closure head; and (e) a plurality of adjusting means attached between each of said substantially identical lifting lugs and said plurality of solid rod lifting pendants attached to said reactor closure head, whereby said latchbox pendants may be rigged once to said overhead crane for handling reactor internals and left in place throughout the entire rigging sequence without changing to turnbuckle pendants for reactor closure head handling.

9. The apparatus according to claim 8, wherein said plurality of latchbox pendants attached to the lifting structure of an overhead crane includes an adjustable turnbuckle between said latchboxes and said lifting structure.

10. The apparatus according to claim 8, wherein said lifting structure of an overhead crane is a tripod to provide a 3-point lift to maintain said reactor internals and said reactor closure head level.

11. The apparatus according to claim 8, wherein said adjusting means is at least one turnbuckle.

12. The apparatus according to claim 8, wherein said adjusting means is a plurality of turnbuckles and one end of each said second set of a plurality of lifting lugs is threaded into each of said turnbuckles.

* * * * *